United States Patent [19]

Bescherer

[11] Patent Number: 5,215,039

[45] Date of Patent: Jun. 1, 1993

[54] BIRD FEEDER HAVING A NON-ROTATABLE PERCH WITH PROTECTIVE SLEEVES

[75] Inventor: Robert E. Bescherer, Bristol, R.I.

[73] Assignee: Aspects, Inc., Warren, R.I.

[21] Appl. No.: 925,117

[22] Filed: Aug. 6, 1992

[51] Int. Cl.⁵ ............................ A01K 31/12; A01K 39/01
[52] U.S. Cl. ................................... 119/57.8; 119/52.2; 119/26
[58] Field of Search .................. 119/52.2, 52.3, 57.8, 119/57.9, 24, 25, 26

[56] References Cited

U.S. PATENT DOCUMENTS

| | | | |
|---|---|---|---|
| 2,591,126 | 4/1952 | Breck, Jr. ............... | 119/52.2 |
| 3,179,244 | 4/1965 | Kuhn ..................... | 119/52.2 |
| 3,568,641 | 3/1971 | Kilham . | |
| 4,259,927 | 4/1981 | Clarke . | |
| 4,318,364 | 3/1982 | Bescherer ............... | 119/57.8 |
| 4,356,793 | 11/1982 | Blasbalg ................ | 119/57.9 |
| 4,829,934 | 5/1989 | Blasbalg ................ | 119/57.8 |

Primary Examiner—Gene Mancene
Assistant Examiner—Todd E. Manahan
Attorney, Agent, or Firm—Barlow & Barlow, Ltd.

[57] ABSTRACT

A bird feeder having a feeder unit for retaining seed and the like is provided with a perch of polygonal cross section that is tightly retained in the wall of the feeder unit. A soft pliable surface is provided on the perch that is apparently more appealing to the birds.

3 Claims, 1 Drawing Sheet

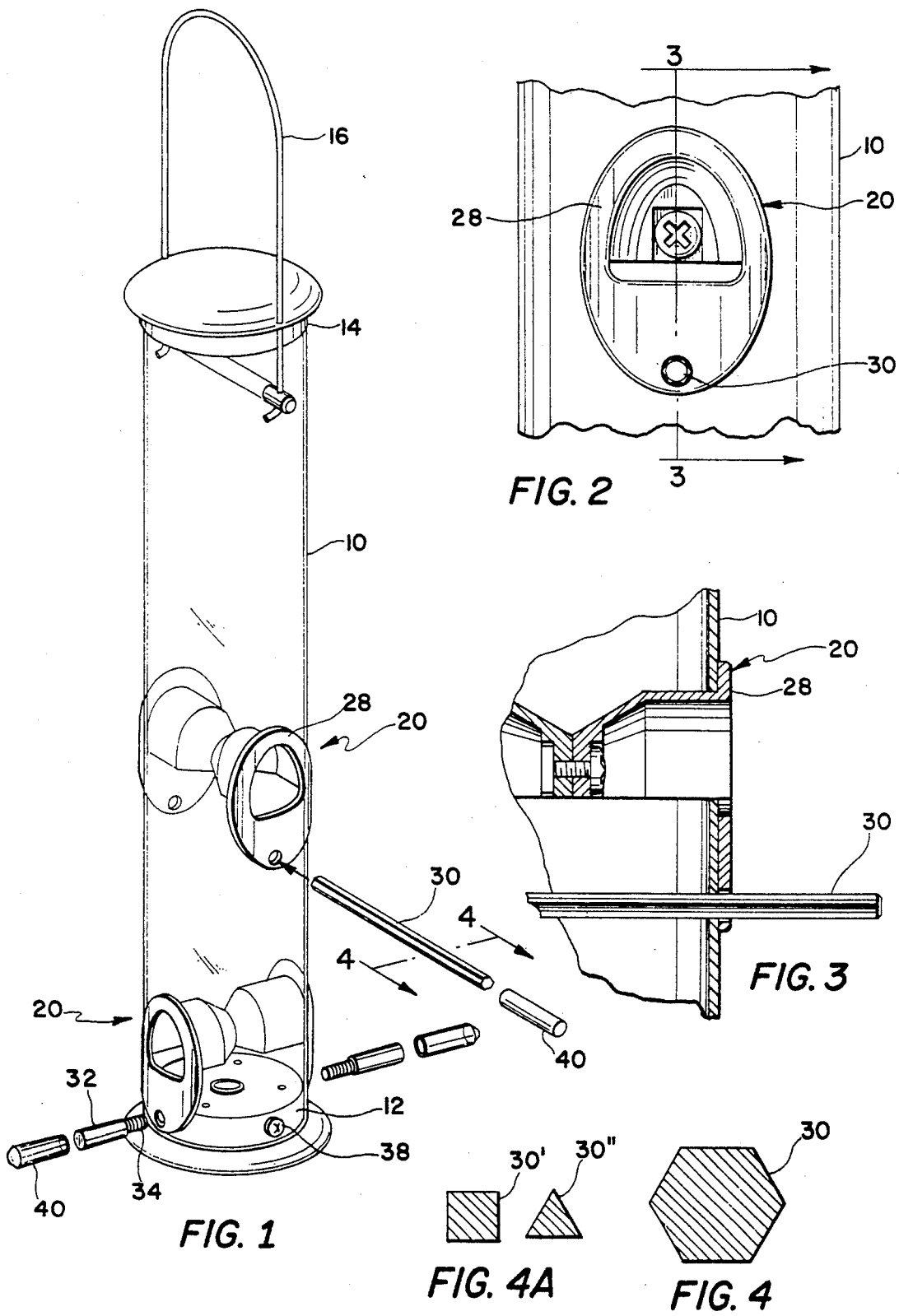

BIRD FEEDER HAVING A NON-ROTATABLE PERCH WITH PROTECTIVE SLEEVES

BACKGROUND OF THE INVENTION

Previously known bird feeders have been subject to some disadvantages, particularly with the perches that are used in connection therewith. Feeders, whether they be cylindrical or rectangular, that utilize plastic shells have found it difficult to control the diameter of the hole as it relates to the diameter of the perch. For example, if the fit between the wall of the feeder container and the perch is too loose, the perch will turn when the bird lands on it and this would lead to discouragement of birds feeding at that particular feeding port. Also, if the fit is too loose the perch will eventually work its way out and fall from the feeder. On the other hand, if the fit is too tight it is difficult for anyone to insert the perch into the wall of the feeder.

In the prior art examples of perches that are passed through the walls of the feeding container are seen in the Kilham patent, U.S. Pat. No. 3,568,641, while an example of a perch which is threaded into the container is seen in the Clarke U.S. Pat. No. 4,259,927.

SUMMARY OF THE INVENTION

The present invention utilizes a feeder unit of stiff, tough plastic material which can be cylindrical, as illustrated, or polygonal. At spaced opposed positions, feeding ports are provided which have an aperture in the wall of the container, which aperture is protected by a metallic member which also serves as a feeding baffle. Apertures are cut in the metal protective ring of a size preferably larger than the diameter of the perch while an aperture in the plastic housing wall is made substantially equal to the cross section of the polygonal perch, which is preferably hexagonal. The hexagonal perch which is provided is intended to be forced through the aperture in the container wall and since the aperture and the cross section of the perch are the same the perch will be prevented from rotating.

It is therefore a primary object of the instant invention to provide a bird feeder that has a novel and improved perch for maintaining the perch in a position that will prevent rotation thereof.

DESCRIPTION OF THE DRAWINGS

FIG. 1 is a detached elevational view of a bird feeder constructed in accordance with my invention;

FIG. 2 is an enlarged partial elevational view illustrating the perch passing through the wall;

FIG. 3 is a partial sectional view taken on lines 3—3 of FIG. 2; and

FIGS. 4 and 4A are illustrative sectional views of perch cross sections taken on line 4—4 of FIG. 1.

DETAILED DESCRIPTION OF THE PREFERRED EMBODIMENT

In the embodiment of the invention as it is seen in the drawings, FIG. 1 is a bird feeder illustrated as comprising a hollow tube for the feeder unit designated 10 which is preferably made of transparent, tough plastic material such as a cellulose acetate or polycarbonate. At one end of the feeder unit 10 is a base 12 which is detachably secured to the feeder unit while the upper end of the feeder unit is closed by a cap 14 that is adapted to be removable for filling but snugly received on the upper end of the tubular unit 10. A hanger member 16 is preferably made from a suitable wire and is pivotally secured to the side wall portion of the feeder unit by a pin which extends diametrically through the walls of the feeder unit which enable the hanger member 16 to be utilized suspending the feeder unit in a conventional manner.

A plurality of feeder ports, as generally indicated by the numeral 20, are provided in the wall of the feeder unit 10. As illuded to, the feeder unit is preferably made from a plastic material that is transparent, so that the level of the bird feed in the container may be readily observed. The feeder ports 20 are of generally conventional construction and, as seen in the drawing, are assembled in pairs so that they extend inwardly in the feeder unit from diametrically opposite sides thereof. The feeder ports are of generally arcuate construction and are formed with a downwardly facing opening to permit the birds to obtain the feed through the ports 20. The feeding ports are also provided with an integral protective ring 28 which will impede the squirrels, for example, for chewing and mutilating the plastic wall of the feeder unit.

The perch elements 30 are comprised of metallic stock which, when assembled in the feeder unit, project outwardly from opposite sides beneath the feeding ports 20. The lower most perch element 32 is provided with a threaded end 34 and is received in a threaded hole in the base 12. The polygonal perch 30 is received through an aperture in the metallic plate 28, which aperture's size is greater than the maximum diameter of the polygonal perch. The aperture in the wall of the plastic feeder unit 10, however, is of a size substantially equal to or slightly undersized by 0.001"–0.002" of the cross section of the perch.

For assembly of the bird feeder, the base 12 is assembled in the lower end portion of the feeder unit 10 and the perch 32 is threaded into the base through apertures in the wall of the feeder unit, thus initially holding the parts together. A secondary securing means, such as screws 38, may be provided. The perch 30, being illustrated as an elongated hexagonal member, is then forced through the aperture in the wall of the feeder unit essentially tightly gripping the walls of the cut aperture in the plastic wall and then is pushed diametrically across and is gently forced through the opposing aperture in the opposite wall portion. To assist in this assembly operation, a chamfer is made on the end of the hexagonal perch 30. After an equal amount of perch is showing on either side of the feed unit, plastic polymer boots such as 40 may be placed over the perches and pushed snugly up against the protective plate 28. Should any difficulty be encountered in getting the boots over the perches, they may be soaked in warm water to make the plastic, which may be medium density polyvinyl chloride, more flexible. The boots serve a further purpose, namely they secure the perch in position laterally, should, for any reason, the aperture in the plastic wall become enlarged and they provide a surface that is soft that is appealing to the birds.

There are obvious advantages to a polygonal perch in achieving the objects of this invention. For example, should the punch tool be dull in cutting the plastic wall, the edges of the polygonal shape will cut into the plastic and permit assembly merely by using a little more force than with a properly cut aperture having the same configuration as the perch cross section. FIG. 4A illustrates alternate polygonal shapes 30', 30" that may be used.

It is seen, therefore, that the instant invention provides a very effective bird feeder assembly which has specific advantages in the manner in which the perch is assembled to the feeder unit.

I claim:

1. A bird feeder assembly comprising a feeder unit having a hollow housing of stiff, tough plastic material; a base closure and a top closure; at least a pair of opposed feeding ports; a perch, said perch having a polygonal cross section, cylindrical apertures located below the feeding ports on opposed wall portions of the feeder unit, said apertures having the same configuration as the cross section of the perch and having substantially the same size to afford a tight force fit, the perch passing through opposed wall portions and being tightly gripped by the housing when the perch is forced into the apertures the perch is prevented from rotation therein; said perch protruding substantially equally from the opposed wall portions of the feeder unit housing and having sleeves thereon that tightly embrace the perch and abut the feeder unit housing.

2. A bird feeder as in claim 1 wherein the perch has a soft pliable polymer surface.

3. A bird feeder as in claim 1 wherein the sleeves are a soft pliable polyvinyl chloride polymer.

* * * * *